March 1, 1932.  F. H. BATEMAN  1,847,327
FERTILIZER DISSEMINATING DEVICE
Filed Dec. 6, 1928  3 Sheets-Sheet 2

Inventor:-
Frederic H. Bateman,
by his Attorneys,
Howson & Howson

March 1, 1932. F. H. BATEMAN 1,847,327
FERTILIZER DISSEMINATING DEVICE
Filed Dec. 6, 1928 3 Sheets-Sheet 3

Inventor:-
Frederic H. Bateman,
by his Attorneys,
Howson & Howson

Patented Mar. 1, 1932

1,847,327

UNITED STATES PATENT OFFICE

FREDERIC H. BATEMAN, OF GRENLOCH, NEW JERSEY

FERTILIZER-DISSEMINATING DEVICE

Application filed December 6, 1928. Serial No. 324,163.

This invention relates to improvements in means for distributing fertilizers, and the principal object of the invention is to provide novel and improved means for disseminating fertilizer materials through the soil to give a substantially uniform and desirable distribution.

There is an increasing tendency to use fertilizers in highly concentrated form, this having the advantages of reducing the bulk of the material to be handled both in transportation and in distribution. Highly concentrated fertlizers, however, are, if brought into direct contact with the planted seeds, highly injurious to the latter, and where this type of fertilizer is used, the prior methods of distribution are unsatisfactory. I have discovered highly practical means whereby the most highly concentrated fertilizers may be utilized to best advantage. To this end, and in accordance with the present invention, I have provided novel means for churning the soil upon which the fertilizer in suitable amounts has been or is being deposited and in such manner as to create a thoroughly uniform dissemination of the fertilizer. The distribution of the fertilizer by my method is such as to make possible the planting of the seeds without injury in the fertilizer-impregnated soil, and accordingly my device finds a valuable application as an element of a planting machine. The device, however, is capable of use independently and as a device solely useful for the purpose of distributing fertilizer through the soil to prepare the soil for subsequent planting and for thoroughly mixing the fertilizer with the soil which has been applied on the side of the growing crops.

Figure 1:
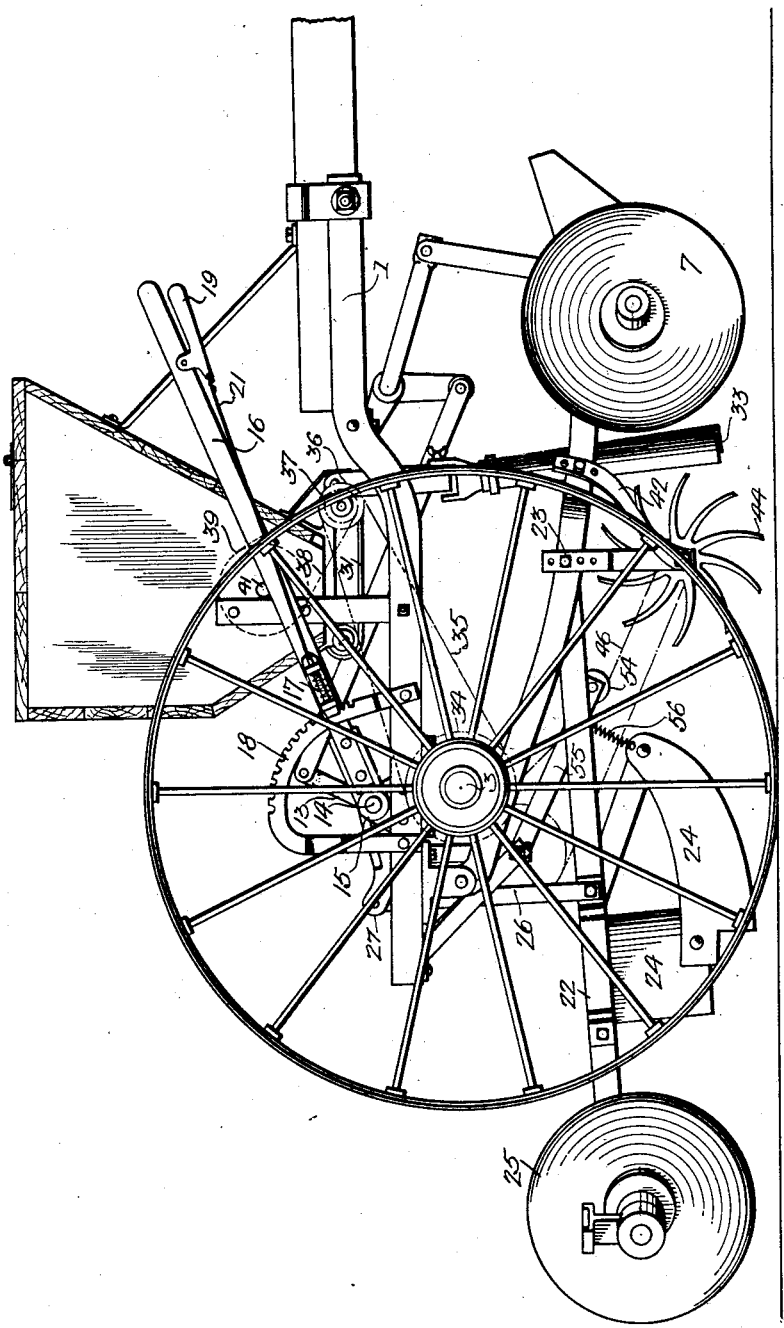
Figure 1 is a side elevation of the essential portions of a planting machine to which a fertilizer distributor made in accordance with the present invention has been applied.

With reference to the drawings, the machine comprises a main frame 1 which is supported on wheels 2 secured to an axle 3 journaled in suitable bearings 4 on the frame. It will be understood that the frame 1 is normally supported in a substantially horizontal position by the draft animal or tractor which draws the machine. Pivotally secured to the main frame at the points 5, 5 is a suspended sub-frame 6 which extends forwardly and downwardly and carries at its forward end a pair of rotary furrow-forming disks 7 of well known type. The forward end of the sub-frame 6 is normally supported by suitable linkage on the main frame, this linkage comprising in the present instance an arm 8 extending upwardly from the forward end of the sub-frame, to the upper end of which is secured one arm of what in effect is a bell crank lever 9 pivotally mounted in a bracket 11 on the main frame, the other arm of this lever being connected through a rod 12 with an arm 13 on a horizontal shaft 14 journaled in bearings 15 on the main frame. This shaft 14 has secured to one end thereof an operating lever 16 which projects forwardly as shown in Fig. 1, with the forward end thereof in a position adjacent that occupied by the operator of the machine. The lever is provided with a spring-pressed detent 17 of well known form, which cooperates with a toothed segment 18 on the main frame to hold the lever in adjusted position, the detent being releasable by means of a pivoted element 19 at the outer end of the lever operatively connected with the detent by means of a suitable wire or rod 21 in well known manner. The foregoing arrangement is such that elevation of the lever 16 from the position in which it is shown in Fig. 1 results in a lowering of the forward end of the sub-frame 6 to an extent bringing the disk 7 into operative relation with the ground over which the machine is advanced.

The machine further includes a second sub-frame 22 pivotally connected at the points 23, 23 to the sub-frame 6. This sub-frame 22 extends rearwardly from the pivot points and carries intermediate its ends a furrow-forming plow 24. On the bifurcated rear end of the sub-frame 22 is carried a pair of rotary furrow-closing disks 25, these as well as the plow element 24 being of a character well known to the art. The rear end of the sub-frame 22 is normally supported by a pair of rods 26 which extend upwardly from opposite sides of the frame and are secured at their upper ends to the outer ends of arms 27 on the shaft 14. The arrangement is such that elevation or lowering of the sub-frame 6 as previously described results in a corresponding movement of the sub-frame 22 so that the soil-engaging elements 7, 24 and 25 are at the same time either in the lower operative position or in an elevated and inoperative position.

Figure 2:
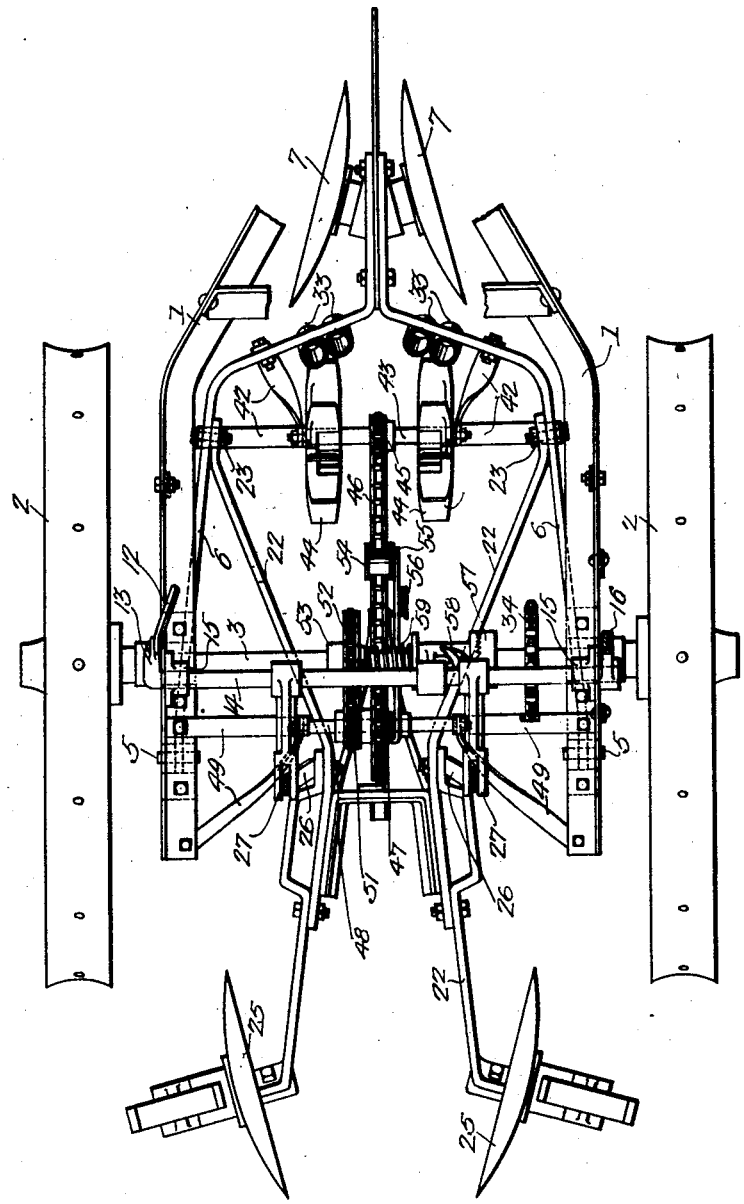
Fig. 2 is a plan view of the machine.
Figure 3:
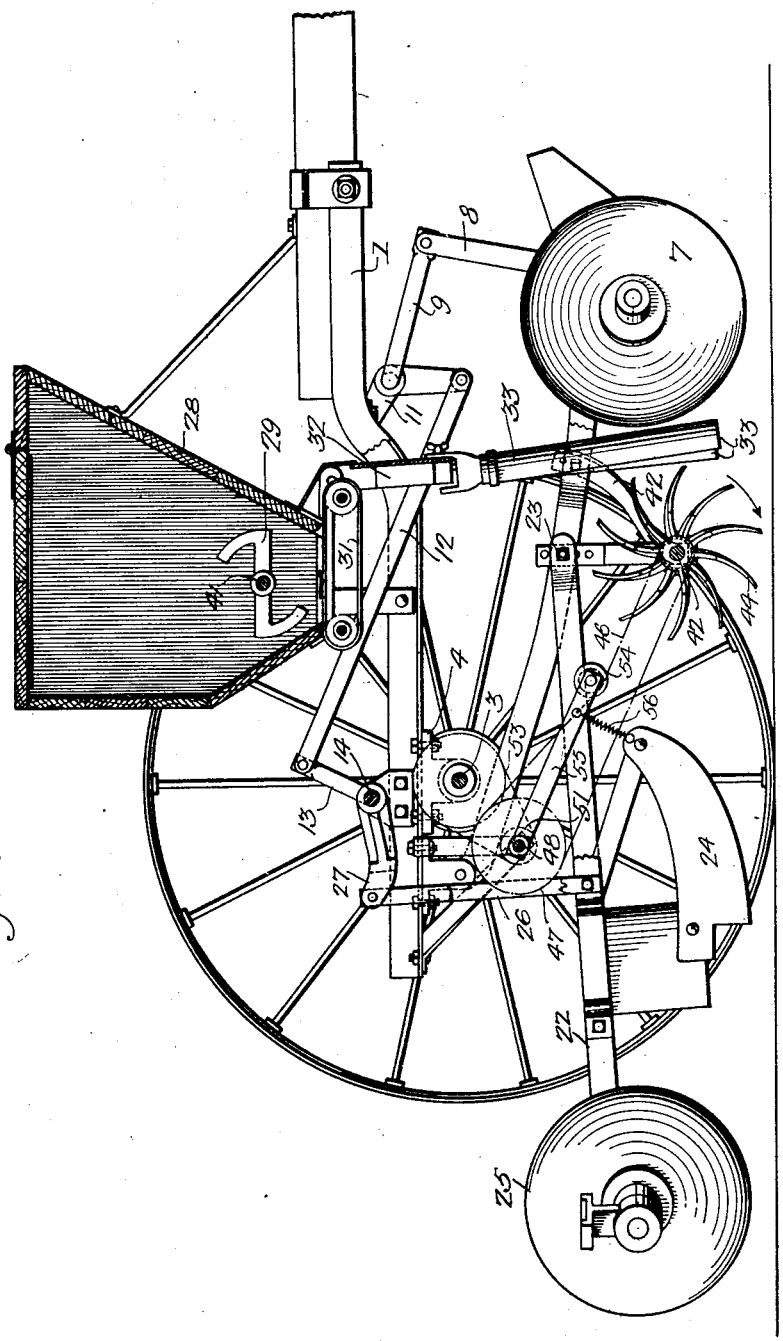
Fig. 3 is a longitudinal sectional view illustrating details of the machine.

Mounted on the main frame 1 is a hopper 28 for a fertilizer material, this hopper having in the interior thereof a rotary beater element 29, and having at the bottom a discharge port, directly beneath which is mounted an endless conveyer 31, this conveyer moving in the direction of the arrow in Fig. 3. The forward end of the conveyer 31 overlies a distributor chute 32 which directs the fertilizer dropping from the forward end of the conveyer into two sets of ducts 33, 33, which pass downward and discharge the fertilizer material respectively immediately in the rear of the furrow-forming disks 7, 7, as shown in Fig. 2. As indicated in Fig. 1, the belt conveyer 31 and the hopper beater element 29 are operated from the axle 3 through the medium of a sprocket 34 on the axle which is operatively connected through a drive chain 35 with a sprocket 36 on the forward roller of the conveyer 31, this roller shaft also carrying a sprocket 37 which is connected through a drive chain 38 with a sprocket 39 on the beater shaft 41, this shaft being journaled in the sides of the hopper 28.

Journaled in two sets of supporting brackets 42, 42 on the sub-frame 6 is a shaft 43, and this shaft carries a pair of soil-churning elements in the form in the present instance of paddle wheels 44, 44, located respectively immediately in the rear of the respective sets of fertilizer tubes 33. Intermediate the wheels 44, the shaft carries a sprocket 45 which is connected by means of a sprocket chain 46 with a sprocket 47 on a jack shaft 48 journaled in bracket arms 49, 49 projecting inwardly from the side bars of the main frame 1 at the rear of the latter. The jack shaft 48 also carries a sprocket 51 which is connected through a chain 52 with a sprocket 53 on the axle shaft 3. Variations in the relative positions of the shafts 43 and 48 are compensated for in the chain 46 by a chain-tensioning device in the form of a roller 54 on an arm 55 which is pivotally supported on the jack shaft 48 and which has attached thereto a spring 56 which tends to hold the roller down upon the upper run of the chain 46.

It will be apparent that the foregoing mechanism provides for a continuous rotation of the shaft 42 as the carriage is advanced, with the result that with the churning wheels in operative position engaging the soil, the latter together with the fertilizer deposited in advance of the churning elements is thoroughly beaten up, resulting in a thorough distribution of the fertilizer through the soil. Since the churning elements are carried by the sub-frame 6, it will be apparent that they are elevated from the operative position into an inoperative position with the furrow disks 7.

With reference to Fig. 2, it will be noted that the operative connection between the shaft 3 and the jack shaft 48 is controlled by a clutch 57, and this clutch in turn is controlled by a cam arm 58 on one of the arms 27, the arrangement being such that when the shaft 14 is rocked through the lever 16 to elevate the various operating elements above the ground and into the inoperative position, the clutch 57 is released, thereby interrupting the operation of the shaft 43 and of the churning elements 44. A spring 59 functions to re-engage the clutch when the shaft 14 is rocked in the opposite direction to bring the elements 44 into operative position, thereby again connecting the shaft 43 with the shaft 3.

It will be obvious that the apparatus as herein described and illustrated is subject to considerable modification without departure from the invention. While the use of the churning elements as described in conjunction with furrow-forming and fertilizer-depositing means is a particularly desirable one, it is apparent that the churning device is capable of independent use for the purpose of disseminating a fertilizer material through the soil upon which it has been deposited. The extreme simplicity and high efficiency of the device, however, renders it capable of practical use in conjunction with the other soil-working elements of a planting machine such as herein described.

I claim:

1. In a fertilizer-disseminating machine, the combination with a wheeled carriage having means for opening a furrow and means for depositing fertilizer therein, of a rotary churning element mounted on the carriage and adapted to be brought into contact with the ground surface in said furrow, and an operative connection between the wheels of the carriage and said rotary element whereby the latter is rotated in contact with the soil at a speed higher than that provided by ground engagement.

2. In an agricultural machine, the combination with a mobile carriage, of a pair of relatively closely arranged and transversely spaced furrow-forming elements, means on the carriage for depositing fertilizer in the two furrows formed by said elements, rotary churning elements operative in each of the furrows to churn the soil and disseminate the deposited fertilizer therethrough, and means operative in a line intermediate the said furrow-forming elements and the churning elements to form a main furrow intermediate the furrows originally formed and encompassing the latter.

3. In an agricultural machine, the combination with a mobile carriage, of a pair of relatively closely arranged and transversely spaced furrow-forming elements, means on the carriage for depositing fertilizer in the two furrows formed by said elements, rotary churning elements operative in each of the furrows to pulverize the soil and disseminate the deposited fertilizer therethrough, means operative in a line intermediate the said furrow-forming elements and the churning elements to form a main furrow intermediate the furrows originally formed and encompassing the latter, and means at the rear of the machine for closing said main furrow.

4. In an agricultural machine, means for forming a pair of transversely-spaced furrows, means for depositing fertilizer therein, churning means for agitating the deposited fertilizer while maintaining it in substantial alignment with the formed furrows, and means operative in a line intermediate the first-named furrow-forming elements and rearwardly of said churning means for forming a main furrow encompassing the first-named furrows.

FREDERIC H. BATEMAN.